United States Patent Office 3,523,921
Patented Aug. 11, 1970

3,523,921
POLYLACTONE RUBBERS AND METHODS
FOR MAKING SAME
Herman S. Schultz, Easton, Pa., assignor to GAF Corporation, New York, N.Y., a corporation of Delaware
No Drawing. Filed June 5, 1968, Ser. No. 734,582
Int. Cl. C08g 17/02, 51/04; C08k 1/02
U.S. Cl. 260—37                                             12 Claims

ABSTRACT OF THE DISCLOSURE

Highly branched lactones and mixtures of lactones when polymerized and cross-linked with a free-radical initiator yield elastomers with the properties of a typical vulcanized rubber.

---

The present invention relates to new polymers and unique methods for producing such materials, and in particular, to elastomeric products which exhibit the typical characteristics of a vulcanized rubber and the production thereof.

It has been proposed to polymerize lactones to yield products which vary in their physical form from viscous liquids to tough, crystalline solids (cf. U.S. Pat. No. 3,021,310), but such polymers which are at least solid at ambient temperatures are low melting materials of poor solvent resistance, as evidenced by their attack by and dissolution in such common solvents as toluene and acetone.

In copending application Ser. No. 734,538 filed June 5, 1968, there is disclosed a process for improved cross-linked unbranched polylactones prepared from those lactones having the general formula:

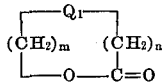

wherein (I) $Q_1$ is —O—, —S— or —$CH_2$—
(II) $m$ and $n$ are integers from 1 to 10; and
(III) $m+n$ is at least 3.

The preferred lactones are those wherein $m+n$ ranges from 3 to 7.

The term "polylactones" as used herein is meant to cover polyesters made from lactones by the proliferative opening of the lactone ring.

Examples of the lactones within the above depicted genus are:

δ-valerolactone
ε-caprolactone
ω-enantholactone
ω-caprylolactone
ω-nonanalactone The improvement described in the aformentioned copending application manifests itself in highly improved thermal properties and outstanding solvent resistance making such products highly useful in a variety of areas not feasible for the unprocessed materials.

It has been discovered that outstanding rubbers having the characteristic properties of a typical vulcanized rubber can be produced from lactone materials and particularly from copolymers of lactones or homopolymers of highly branched lactones when such polymeric substances are cross-linked with a free-radical initiator. These products show superior resistance to aging on standing for long periods of time in the ordinary atmosphere in normal variations of light.

In contradistinction to the cross-linked polymers described in the aforementioned copending application which art also cross-linked polylactone materials, the products and processes described herein are unique and by the careful selection of lactones, it is possible to produce a final product which behaves as a typical rubber material.

It is therefore an object of this invention to provide new and useful polymers.

It is another object of this invention to provide new, useful and outstanding polymers derived from lactones.

It is still another object of this invention to provide new useful and outstanding polylactones which are characterized by typical vulcanized rubber properties.

It is a furthtr object of this invention to provide new, useful and outstanding cross-linked polylactones which exhibit some of the properties of a vulcanized rubber.

Another object of this invention is to provide rubber polymers derived from the cross-linking of lactone copolymers.

Still a further object of this invention is to provide rubber polymers derived from the cross-linking of branched and preferably highly branched lactone homopolymers.

A further object herein lies in the provision of processes to produce rubbery filled or unfilled polymers from lactone polymers.

In fulfilling the foregoing objects, it has been found that cross-linked polylactones may be prepared from lactones of the following general formula.

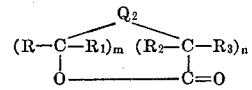

wherein
(I) $Q_2$ is —O—, —S— or

(II) The R's are independently hydrogen, halogen, alkyl, alkoxy, cycloalkyl, aralkyl, alkaryl, aryl and aryloxy,
(III) $m$ and $n$ are integers from 1 to 10
(IV) $m+n$ is at least 3
(V) The preferred lactones are those whert in $m+n$ ranges from 3 to 7
(VI) The total number of non-hydrogen R substituents attached to the carbon atoms does not exceed 4, and preferably does not exceed 3.

The following branched lactones may also be used:

δ-caprolactone
α-methyl-δ-valerolactone
α-isopropylδ-valerolactone
β-ethyl-δ-valerolactone
β-n-propyl-δ-valerolactone
γ-ethyl-δ-valerolactone
δ-ethyl-δ-valerolactone (δ-enantholactone, δ-heptolactone)
α-methyl-δ-caprolactone
β-methyl-δ-caprolactone
γ-ethyl-δ-caprolactone
α-methyl-ε-caprolactone
δ-methyl-ε-caprolactone
β-methyl-ω-caprolactone
β-methoxy-ε-caprolactone
δ-ethoxy-ε-caprolactone
β-isoamyl-δ-valerolactone
α,α-diethyl-δ-valerolactone
α,β-dimethyl-δ-valverolactone
β-methyl-β-ethyl-δ-valverolactone
γ-methyl-δ-pentyl-δ-valerolactone α,α-dimethyl-δ,δ-dipropyl-δ-valerolactone
α,γ,γ-trimethyl-β-ethyl-δ-valerolactone
β,β-diisopropyl-ε-caprolactone
β,δ-dimethyl-ε-caprolactone
3,5,5-trimethyl-ε-caprolactone
β,β,δ,δ-tetramethyl-ε-caprolactone
β,β-dimethyl-ω-enantholactone These lactones may be employed for polymerization per se, in admixture with each other or in admixture with the products of copending application Ser. No. 734,538 filed June 5, 1968 referred to above. The polymer precursion to the cross-linked rubbers included herein are homopolymers of branched polylactones, copolymers of unbranched polylactones, copolymers of branched and unbranched polylactones and copolymers of branched polylactaones. The term "copolymer" used herein is meant to cover polymers containing two or more monomer units in the polymer chain. Cross-linked copolymers made from branched lactones in all proportions and homopolymers of branched lactones are rubbers. Cross-linked copolymers of unbranched lactones, wherein the comonomer is a branched lactone of area rubbers when the monomer mixture contains at least 5 mole percent of one of the lactone comonomers (branched or unbranched). The term "branched" lactones as used herein is meant to cover lactones where one or more of the R groups in the formula is a substituent other than hydrogen.

As pointed out above, in order to obtain polymers which are suitable in subsequent cross-linking reactions to produce rubber materials, it has been found, empirically, that it is necessary to employ in the polymer-forming reaction a mixture of at least two different lactones (at least 5 mole percent of one and not more than 95 mole percent of a second) whereby a copolymer, interpolymer, or terpolymer is produced. If, instead of a mixture of comonomeric lactones, one employs a branched lactone it has been found, too, that the resultant homopolymer upon subsequent cross-linking reaction also produces a rubber material. It is equally clear that branched lactones may be used in admixture with any of the other lactones herein contemplated.

Products can be made from the above polylactones after formulation which at some stage during manipulation are thermoplastic and can be made into films, coatings and other shaped forms by such diverse techniques as compression, transfer and injection molding, as well as extrusion, calendering and coating from a solvent. The starting polymers can be compounded with fillers and cross-linking agents before reaction to give the final desirable properties on curing. The polyactone precursors of the final products described herein are saturated compounds; that is, they contain no double bonds. Elastic filaments can be made by solvent spinning or melt spinning followed by curing of the formulation containing cross-linking agents. The improved polyactone rubbers of this invention are also useful as adhesives or as a component of adhesive for various substrates, similar or dissimilar, including of course, substrates of improved polylactones as well. The new rubbers herein described are also useful as processing aids and/or high impact improvers for many resin systems and may be used to modify the properties of or adhere to polyolefins, polyesters, polyacetals, polystyrene, ABS type polymers, polyethylene, polyamides, polyvinyl chloride, polyvinyl esters, polyvinyl ethers, polycarbonates and the like homo and copolymers, etc. The products of this invention when used as above can be prepared before hand or in situ in combination with other components with which they can crosslink. Films, fibers, coatings and other shaped articles can also be made by the above method after the cross-linked polylactones have been prepared by well controlled formulation with a cross-linking agent and optionally fillers to preserve manipulability but still sufficient to get improved insensitivity to solvents and improved thermal properties.

The production of polymers suitable for the subsequent cross-linking reaction is generally carried out employing the following types of catalysts and catalyst systems:

(I) $R_4—M_1$ (II) $(R_4)_b—M_2—(R_4)_a$ and (III)

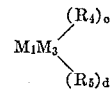

wherein the M's are metals of Groups I-A, II-A, II-B and III-A; $R_4$ may be alkyl, aryl, aralkyl or alkaryl; $R_5$ may be hydrogen, halogen, hydroxy, alkoxy, acyloxy, aryloxy, aralkoxy, and alkaryloxy; $b$ is an integer from 1 to 2 for Group II metals and 1 to 3 for Group III-A metals; $a$ is 0 or 1 for Group II metals; 0, 1 or 2 for Group III-A metals; $a+b=2$ for Group II metals and $a+b=3$ for Group III-A metals. In Formulae I and III, $M_1$ is a Group I-A metal (alkali metal); $M_2$ is either a Group II-A, II-B or III-A metal; and $M_3$ is a Group III-A metal; $c$ is an integer from 0 to 3; $d$ is an integer from 1 to 4 and $c+d=4$.

Suitable catalysts include:

methyl sodium
isopropyl sodium
ethyl lithium
n-butyl lithium
iso-octyl lithium
phenyl lithium
2-tolyl lithium
benzyl lithium
benzyl sodium
phenethyl sodium
phenethyl lithium
phenethyl potassium
dodecyl potassium
isobutyl potassium
naphthyl potassium
naphthyl lithium
diethyl magnesium
di-n-propyl magnesium
diphenyl magnesium
n-butyl isobutyl zinc
n-butyl isobutoxy zinc
n-amyl, n-amoxy cadmium
trimethyl aluminum
diethyl aluminum hydride
tributyl aluminum
tri-isobutyl aluminum
triphenyl aluminum
tri-n-hexyl aluminum
diisopropyl aluminum hydride
di-n-hexyl aluminum hydride
methyl aluminum dihydride
benzylaluminum dihydride
dibenzyl aluminum hydride
phenyl aluminum dihydride
methyl diphenyl aluminum
ethyl phenyl aluminum hydride
4-(ethoxybutyl)-diethyl aluminum
ethoxy dibutyl aluminum
isobutoxy isobutyl aluminum hydride
isobutoxydiethyl aluminum
diphenyl aluminum hydride
methylgalliumdichloride
triethylgallium The general procedure for polymerizing the lactones involves adding the selected catalyst in an amount varying from 0.001% to up to 5% by weight thereof based on the weight of the lactone, to the lactone either in bulk or in an inert, liquid suspending medium which may or may not be a solvent for the lactone. A preferred catalyst range is 0.01% to 1%. Suitable inert liquids include benzene, toluene, xylene, dioxane, diethyl ether, chloroform, hexane, tetrachloroethane, tetrahydrofuran, n-heptane, and the like. Any concentration of lactone in solvent may be used with a preference for 25% to 70% by weight of lactone. The temperature of polymerization may vary from −40° C. up to about 180° C. with a preferred range of −20° C. to 100° C. Mixtures of catalysts may be used as well as single catalyst systems. It is also preferred and, in most instances, necessary to conduct all procedures under careful anhydrous and anaerobic conditions to obtain optimum polymeric products.

In this invention the polymer precursors for the cross-linked rubbers are characterized by viscosity numbers of from about 1.0 to about 10.0, preferably 1.5 to 6.

The following examples illustrate polymer preparations.

EXAMPLE 1

All of the manipulations described in this example are carried out in a "dry box" or "glove box" containing a nitrogen atmosphere in order to obtain conditions which are both anhydrous and anaerobic. Hypodermic syringe techniques are used to transfer catalyst or initiator. The reaction vessel employed is a screw top, meticulously cleaned and nitrogen purged bottle equipped with a polyethylene liner for the closure. Into such a reaction bottle there is charged a mixture of 66 g. (0.65 mole) of 2-p-dioxanone and 50.5 g. (0.44 mole) ε-caprolactone, both monomers having been previously carefully fractionated and collected under nitrogen. Into this mixture there is then injected with a hypodermic syringe, at room temperature, 0.5 cc. aluminum triisobutyl solution (25% in heptane), and the closed bottle shaken by hand for a few minutes and then put onto a shaker overnight. The final product produced in the bottle is a highly elastic material which after removal from the reaction vessel is cut up into small pieces and pumped for several hours to remove any traces of hydrocarbon solvent arising from the catalyst solution. The inherent viscosity and viscosity number for 0.5 g. in 100 ml. tetrachloroethane at 25° C. is determined to be 3.1 and 7.6 respectively. Films are prepared on a Carver press and tensile strength measurements made thereon using an Instron machine show the film to have 418 p.s.i. tensile strength, an ultimate tensile of 1,580 p.s.i. and an elongation of 17.3 inches beginning with a one inch grip separation. An X-ray diffraction pattern made on the films shows large amounts of diffuse scattered radiation which is characteristic of amorphous material with small sharp rings denoting crystallinity. A sample of the product is placed into a large volume of toluene and agitated at room temperature for three days. The polymer shows only very slight swelling. The polymer is then filtered and pumped and the filtrate is mixed with petroleum ether in large excess. No precipitate or turbidity is formed. While it's known that the high molecular weight homopolymer from 2-p-dioxanone is insoluble in toleuene and petroleum ether, the high molecular weight homopolymer from ε-caprolactone is soluble in toluene. The charge in solvent properties as illustrated in this example shows true copolymer formation.

EXAMPLE 2

The general procedure of Example 1 is repeated using the same co-reactants and catalysts, but varying the mole percent of the ε-caprolactone. Copolymers are produced having the following mole percent of ε-caprolactone:

(A) 28.8%
(B) 38.2%
(C) 44.8%
(D) 50.5%
(E) 55.2%
(F) 74%

The products have the following inherent viscosity values measured similarly as in Example 1: 2.16, 1.88, 2.37, 2.38, 2.39 and 2.83 respectively.

EXAMPLE 3

The general procedure of Example 1 is once again repeated in three separate runs using the following weights and indicated moles of reactants as well as the number of ccs. of the same catalyst solution.

RUNS

| | a | b | c |
|---|---|---|---|
| Weight of ε-caprolactone, g | 77.06 | 48.23 | 79.01 |
| Moles ε-caprolactone | 0.676 | 0.423 | 0.693 |
| Weight of 2-p-dioxanone, g | 23.09 | 23.07 | 12.57 |
| Moles 2-p-dioxanone | 0.227 | 0.227 | 0.123 |
| Catalyst solution, cc | 1.0 | 0.8 | 0.9 |
| Mole percent caprolactone | 74 | 65 | 85 |

The specific polymerization procedure is modified somewhat so that for two hours the samples are shaken and thereafter placed into a 51° C. oven for two hours, then removed and allowed to stand overnight. As in Example 1 the products are pumped clean of solvent arising from the catalyst solution. The inherent viscosities are measured and found to be 3.10, 3.31 and 2.99 respectively.

In the above examples the viscosities are determined at 25° C., using a Ubbelhode viscometer. The inherent viscosity $(\eta_{inh}) = (Ln\eta_r)/c$. where $\eta_r$ is the relative viscosity and c. is the concentration in grams per 100 ml. of solvent. The reduced viscosity (or the viscosity number) is solvent The reduced viscosity (or the viscosity number) is equal to the relative viscosity minus one divided by the concentration (c.).

The production of the rubber materials from the copolymers and highly branched homopolymers hereinbefore described and exemplified is achieved by reacting such copolymers and the like with a free-radical forming system to effect cross-linking. The preferred initiators include:

Peroxides (e.g., benzoyl peroxide, acetyl peroxide, dicumyl peroxide, stearoyl peroxide, 2,4-dichlorobenzoyl peroxide, ditertiarybutyl peroxide, tertiary butyl perbenzoate, etc.)
Hydroperoxides
Azides (e.g., disulfonazides, aromatic diazides, etc.)
Azo compounds
Diazonium compounds, and
Diazoamino compounds with or without sulfur or the additive catalytic or sensitizing effect and action of ultra-violet light or other forms of radiation.

Further improvement in properties can be obtained by the incorporation of fillers such as calcium carbonate, metal oxides (e.g., iron oxides), silica, neutral or basic carbon blacks, etc. The particular peroxide or other radical forms chosen depends on a (1) the half life of the radical forming compound; (2) the means of incorporating the radical former and other ingredients into the polymer formulation (i.e. the solvent, coating, roll mill, Banbury mill, melt extruder, etc.); (3) the temperature level requirements for carrying out formulation and relationship to curing temperature level; (4) the forms of energy used to trigger the radical forms (i.e. heat, ultraviolet light, visible light and sensitizer system, etc.); (5) the relative rates of the competing reactions during cross-linking and (6) the specific application or use of the total polymer formulation. Shaped articles can therefore be formed in appropriate equipment and then thermoset by selecting appropriate formulations and manipulative conditions and equipment.

The temperature for carrying out the heat initiated cross-linking process should be above the temperature at which free radical formers are incorporated and preferably at temperatures from 100° C. to about 250° C. The time for producing the cross-linked products of this invention is not critical and varies from about 1 minute to about 1 hour, and preferably from 1 minute to about less than 30 minutes. The amount of catalyst may vary considerably and generally from about 0.5% to 10% by weight thereof based on the weight of a polylactone is preferred.

Still another example of the product of a copolymer suitable for cross-linking to a rubbery substance is illustrated in the following example.

EXAMPLE 4

The general procedures of Example 1 employing the same techniques therein are repeated using 21.4 g. of a mixture of the same monomers used in Example 1, but the mixture contains 74.3 mole percent of the caprolactone. An additional change in the procedure of Example 1 lies in the use of 0.3 cc. of the diethyl cadmium solution (25% in heptane). The final polymer product, after cleaning up as in Example 1 is found to have an inherent viscosity of 2.53 and a viscosity number of 5.08 (measured as in Example 1).

In the following examples highly branched lactone homopolymers as well as copolymers of different monomeric lactones are cross-linked in accordance with the processes of this invention to produce rubbery substances.

EXAMPLE 5

The copolymer of run $b$ of Example 3 is formulated with cross-linking initiator and filler on a rubber mill as follows. Onto a 2-roll rubber mill equipped with rollers capable of being warmed by pressured steam there is added a mixture of 15 g. of the aforementioned copolymer, 13 g. of calcium carbonate (Whitcarb R) and 0.75 g. of dicumyl peroxide. This mixture is compounded in the conventional manner on the rubber mill for 30 minutes. Films are then prepared from this formulation and cured in a Carver press with the salient conditions and the resulting properties set forth below.

A typical tensile curve (on an Instron machine) shows that the copolymer has been cross-linked to a material which gives a typical vulcanized rubber curve. The flexing cycles recited in the above table are carried out on the Instron machine from 20 to 300% elongation. The percent hysteresis is the area in the hysteresis loop divided by the total area under the stress strain curve within the limits of the cycle. The product is qualitatively a typical cured rubber. The properties of the product do not change in any significant manner with time and conditioning as is the case with the uncured (uncross-linked polymer). Curing, i.e. cross-linking, has clearly stabilized the copolymer and in addition the films produced therefrom are insoluble in benzene.

EXAMPLE 6

The procedure described in Example 5 is repeated except that in place of the dicumyl peroxide an equal weight of benzoyl peroxide is used. In the following table the results similarly as in Example 5 are summarized.

| Carver press time, min. | Cure temp., °C. | No. flexing cycles | Tensile, p.s.i. | Percent elongation at break | Modulus, percent | | Percent hysteresis |
|---|---|---|---|---|---|---|---|
| | | | | | 100 | 300 | |
| 15 | 125 | 0 | 928 | 1,214 | 229 | 385 | |
| 15 | 125 | 7 | 1,120 | 1,180 | 134 | 356 | 15.6 |
| 30 | 125 | 0 | 1,240 | 1,180 | 225 | 400 | |
| 30 | 125 | 7 | 968 | 868 | 205 | 375 | 21.7 |
| 30 | 125 | 7 | 1,040 | 922 | 212 | 390 | 17.9 |
| 15 | 160 | 0 | 823 | 976 | 151 | 289 | |
| 15 | 160 | 7 | 1,000 | 1,174 | 162 | 322 | 20.6 |
| 15 | 160 | 7 | 738 | 808 | 147 | 206 | 21.8 |

EXAMPLE 7

Again, the procedure of Example 5 is repeated except that the components milled on the rubber mill are 20 grams copolymer, 10 grams calcium carbonate (Whitcarb R), 0.75 gram dicumyl peroxide. A summary of the properties appears in the following table.

| Carver press time, min. | Cure temp., °C. | No. flexing cycles | Tensile, p.s.i. | Percent elongation at break | Modulus, percent | | Percent hysteresis |
|---|---|---|---|---|---|---|---|
| | | | | | 100 | 300 | |
| 15 | 125 | 0 | 1,111 | 754 | 229 | 473 | |
| 15 | 125 | 7 | 1,300 | 998 | 206 | 398 | 10.3 |
| 30 | 125 | 0 | 1,040 | 606 | 18 | 401 | |
| 30 | 125 | 7 | 1,550 | 1,222 | 188 | 356 | 12.1 |
| 30 | 125 | 12 | 1,660 | 1,046 | 216 | 470 | 14.2 |
| 60 | 125 | 0 | 1,060 | 1,104 | 169 | 316 | |
| 60 | 125 | 7 | 912 | 864 | 168 | 346 | 16.5 |
| 60 | 125 | 7 | 971 | 920 | 159 | 386 | 16.8 |
| 15 | 160 | 0 | 892 | 1,348 | 71 | 230 | |
| 15 | 160 | 7 | 870 | 986 | 141 | 295 | 19.5 |

EXAMPLE 8

A formulation is prepared again as in Example 5 using, however, 20 grams of the copolymer of run $a$ of Example 3, 10 grams calcium carbonate (Whitcarb R) and 1 gram dicumyl peroxide. Milling time is 10 minutes and the samples are similarly cured on a Carver press with the following rubber characteristics obtained. The products are benzene insoluble.

| Carver press time, min. | Cure temp. °C. | No. flexing cycles | Tensile, p.s.i. | Percent Elongation at break | Modulus, percent | | Percent hysteresis |
|---|---|---|---|---|---|---|---|
| | | | | | 100 | 300 | |
| 2 | 160 | 0 | 1,010 | 1,096 | 210 | 396 | |
| 2 | 160 | 7 | | | | | 18.1 |
| 2 | 160 | 7 | 1,010 | 1,164 | 218 | 399 | |
| 5 | 160 | 0 | 863 | 926 | 235 | 436 | |
| 5 | 160 | 7 | | | | | 16.5 |
| 5 | 160 | 7 | 962 | 932 | 225 | 445 | |
| 15 | 160 | 0 | 935 | 908 | 219 | 420 | |
| 15 | 160 | 7 | 980 | 740 | 230 | 528 | 20.0 |
| 15 | 160 | 7 | 1,120 | 1,060 | 185 | 362 | 16.2 |
| 60 | 160 | 0 | 325 | 200 | 277 | | |
| 5 | 190 | 0 | 321 | 674 | 116 | 192 | |
| 5 | 190 | 7 | 405 | 566 | 114 | 282 | 26.1 |
| 5 | 190 | 7 | 350 | 382 | 117 | 309 | 23.2 |

| Carver press time, min. | Cure temp., °C. | No. flexing cycles | Tensile, p.s.i. | Percent elongation at break | Modulus, percent 100 | Modulus, percent 300 | Percent hysteresis |
|---|---|---|---|---|---|---|---|
| 2 | 160 | 0 | 576 | 379 | 465 | 551 | |
| 2 | 160 | 0 | 547 | 194 | 548 | | |
| 2 | 160 | 7 | | | | | 32.6 |
| 2 | 160 | 7 | 786 | 294 | 513 | | |
| 5 | 160 | 0 | 611 | 626 | 525 | 594 | |
| 5 | 160 | 7 | | | | | 32.5 |
| 5 | 160 | 7 | 1,040 | 494 | 394 | 395 | |
| 5 | 160 | 7 | | | | | 31.5 |
| 5 | 160 | 7 | 896 | 620 | 336 | 695 | |

EXAMPLE 9

A formulation is prepared and cured as in Example 5 using 20 grams of a copolymer similar to that of Example 5 except is contains only 45 mole percent of the ε-caprolactone, 10 grams iron oxide and 1 gram dicumyl peroxide. A benzene insoluble rubber results.

EXAMPLE 10

The following polymerization is carried out under anhydrous anaerobic conditions using the same technique as Example 1. Mixed isomers of methyl ε-caprolactone are rapidly distilled under nitrogen through a Vigreux column so as to give only a small forecut and hindcut. The approximate composition is 40% beta and delta methyl ε-caprolactone, 24% gamma methyl ε-caprolactone and 36% epsilon methyl ε-caprolactone. 0.9 cc. aluminum triisobutyl solution (25% in heptane) is injected into 45.1 g. of this mixture in a 4 ounce screw top bottle inside a nitrogen filled dry box. The bottle is placed into an 87–90° C. bath overnight. The next morning the product appears to have polymerized completely and to be non-flowing at 85° C. The polymer on cooling is broken out of the bottle and chopped up and pumped overnight to remove small amounts of volatiles. The product is an elastomeric material that can be described as a form stable elastomer gum. The material is soft, but acts like a tough elastomer under sharp stress. The apparent softening point on a Mannheim block is 70° C. (flows and fuses permanently under slight probing pressure). Elastic filaments can be pulled from a melt. $\eta_{inh}$ and viscosity number of a solution of 0.5 g. per 100 ml. tetrachloroethane at 25° C. are 1.37 and 2.16 respectively. The chemical resistance of the product produced in this example is determined and reported by the technique described in the Journal of Polymer Science, volume 21, pages 225 to 235 (1956) wherein a value 0 indicates the material is unaffected by boiling solvent; (1) that is melted or becomes sticky in boiling solvent; (2) that it is partly soluble in boiling solvent; (3) that it is soluble in boiling solvent and precipitated cold; (4) that it is soluble in boiling solvent and not precipitated cold; (5) that it is soluble in cold solvent. Boiling solvent refers to a boiling time of about 2 minutes. In the instant case the product rates 0 in 30% sulfuric acid and 10% aqueous sodium hydroxide and a value of 5 in acetone, ethyl acetate, ethylene dichloride, carbon tetrachloride and toluene.

EXAMPLE 11

The following polymerization is carried out using the same technique as Example 1. A mixture is made of ε-caprolactone and mixed methyl isomers of ε-caprolactone (approximate composition of mixed methyl isomers is 40% β- and δ-methyl ε-caprolactone, 24% γ-methyl-ε-caprolactone and 36% ε-methyl-ε-caprolactone) which contains 58.8 mole percent ε-caprolactone. 30 cc. of the mixture is transferred to a 10 dram screw top vial in a dry box and 0.4 cc. aluminum triisobutyl solution (25% in heptane) is added. The sealed vial is heated at 90° C. overnight. The product is pumped off and is a tough elastomeric gum that first cold draws and is then a tough rubbery material exhibiting repeated reversible extensibility. One can bounce the piece. The product is dimensionally stable. $\eta_{inh}$ and viscosity number (0.5 g./100 ml. tetrachloroethane) are 2.28 and 4.24 respectively.

EXAMPLE 12

A series of polymerizations are carried out with the same monomers and catalyst, as Example 11. The reaction and results are summarized in the following table. Reaction is carried out overnight at 113–116° C. Polymerization is apparently quantitative.

| | 1 | 2 | 3 | 4 |
|---|---|---|---|---|
| Mole percent ε-caprolactone | 76.5 | 59.2 | 45 | 30.8 |
| Polymer character (all form stable.) | Tough, elastomers, bounces like a rubber ball, cold draws to give a tough clear film with reversible extensibility. | Similar to 1 but more; bouncy. | Elastomeric and bouncy but softer, pieces can be pulled off with hand. | A tough elastomeric gum from which pieces can be pulled off easily. Soft. |
| $\eta_{inh}$ (0.5 g./100 ml. tetrachloroethane.) | 2.34 | 2.07 | 2.05 | 1.88. |
| Viscosity number (0.5 g./100 ml. tetrachloroethane). | 4.44 | 3.64 | 3.58 | 3.12. |
| Shore A hardness | About 65 | About 20 | About 20 | About 10. |

EXAMPLE 13

A series of copolymerizations are set up and carried out in a manner similar to Example 1. ε-Caprolactone and δ-valerolactone are fractionally distilled and collected under nitrogen. The catalyst used is a solution of aluminum triisobutyl (25% in heptane). The reactions are summarized in the table following. The yields are apparently quantitative.

| No. | Mole percent ε-caprolactone | ε-Caprolactone, g. | δ-Valerolactone, g. | cc. Cat. solution, g. | Viscosity No. |
|---|---|---|---|---|---|
| 1 | 26.1 | 15.50 | 38.50 | 1 | 4.50 |
| 2 | 36.3 | 21.84 | 32.77 | 1 | 4.54 |
| 3 | 57 | 44.60 | 21.70 | 1 | 4.72 |
| 4 | 78.8 | 42.70 | 10.51 | 1 | 5.38 |

EXAMPLE 14

A polymerization is carried out as in Example 13 using the δ-valerolactone, ε-caprolactone mixtures of No. 4 of Example 13.

Diethyl zinc (1 cc. solution of 25% solution in heptane) is used as catalyst to give a product similar to No. 4 of Example 13.

EXAMPLE 15

A series of copolymerizations are set up and carried out as in Example 1 between 2-p-dioxanone and δ-valerolactone. The monomers are fractionally distilled and collected under nitrogen. The catalyst is a solution of aluminum triisobutyl (25% in heptane). The products range from tough film and filament forming polymers to elastomeric gum stocks depending on the mole percent δ-valerolactone in the 2-p-dioxanone. For example, a sample with 32 mole δ-valerolactone is a tough film and fiber former while one with 63 mole percent δ-valerolactone is a soft elastomer gum stock.

EXAMPLE 16

Example 15 is repeated except that an equal weight of diethyl zinc catalyst (25% solution in heptane) is used. The results are similar to those of Example 15.

(Whitcarb R) and 1 gram of 40% dicumyl peroxide on calcium carbonate. Mill time is 20 minutes. The uncured stock from the mill becomes more elastic and very tough and can be pulled into a tough filament which is reversibly extensible. The formulated stock is cured in a Carver press. The tensile curves are typical rubber curves. The table below summarized the presumptive properties. The cured rubbers are benzene insoluble. Similar formulations from the other copolymers of Example 12 on curing give similar products of varying elasticity and stiffness.

| Carver press time, min. | Cure temp, °C | II flexing cycles | Tensile, p.s.i. | Percent elongation at break | Modulus, percent | | Percent hysteresis |
|---|---|---|---|---|---|---|---|
| | | | | | 100 | 300 | |
| 2 | 160 | 0 | 667 | 1,588 | 103 | 142 | |
| 2 | 160 | 8 | 1,540 | 1,330 | 124 | 215 | 30.4 |
| 5 | 160 | 0 | 1,220 | 1,390 | 122 | 193 | |
| 5 | 160 | 8 | 1,590 | 1,460 | 114 | 165 | 22.8 |
| 15 | 160 | 0 | 1,530 | 1,580 | 114 | 187 | |
| 15 | 160 | 8 | 1,360 | 1,206 | 130 | 234 | 22.9 |
| 30 | 160 | 0 | 1,190 | 1,290 | 133 | 212 | |
| 30 | 160 | 8 | 1,590 | 1,340 | 149 | 295 | 26.1 |

EXAMPLE 17

Polymerization of β-methyl-δ-valerolactone

This example is also carried out under anhydrous anaerobic conditions and using techniques as in Example 1. 56.36 g. (0.495 mole) β-methyl-δ-valerolactone (from Carbide and Carbon and distilled and collected under nitrogen, $n_D^{25}$ 1.4501) is reacted with 0.5 cc. aluminum triisobutyl solution (25% in heptane) at room temperature in a 4 oz. screw top bottle by shaking overnight. A clear, colorless resin that is rubbery and can be pierced with a spatula is formed. On breaking out of this reaction bottle, the product is found to be malleable in the hand but on placing under sharp stress (bouncing) shows elastomeric properties without apparent deformation in a manner similar to "Silly Putty." The inherent viscosity (for c.=0.5 in tetrachloroethane at 25° C.) is 1.12. The intrinsic viscosity [η] is 1.30. It is difficult to determine if the material has a melting point and if this is below room temperature. An apparent softening point is 47° C. The material is chemically resistant at room temperature to absolute ethanol, n-heptane, 10% NaCl. It dissolves in acetone, ethyl acetate, ethylene dichloride and toluene and swells in 30% $H_2SO_4$ and 10% NaOH. It is partly soluble in carbon tetrachloride and hydraulic oil.

EXAMPLE 18

A portion of the product of Example 10 is dissolved in benzene and reprecipitated twice by pouring into excess methanol. The recovery from the two reprecipitations is 87% and the inherent and reduced viscosities are 1.67 and 2.72 respectively. 15 grams of this material is formulated as in Example 5 on a rubber mill with 13 grams of calcium carbonate (Whitcarb R) and 0.75 dicumyl peroxide. The products are cured in a Carver press under the conditions set out in the table below. The cured products are typical rubbers which are insoluble in benzene in contrast to the uncured copolymer. Milling time is 15 minutes.

Metal oxides such as iron oxide, silicas and neutral or basic carbon blacks can be used in place of calcium carbonate as fillers to give enhanced desirable properties of the filled cross-linked polylactones of appropriate compositions.

EXAMPLE 20

The formulation of Example 19 is prepared except that $CaCO_3$ is omitted. A useful crosslinked rubber is obtained that is similarly insoluble in benzene in contradistinction to the uncured (uncross-linked) copolymer of ε-caprolactone and mixed methyl isomer of ε-caprolactone.

EXAMPLE 21

To an 8% by weight benzene solution of the interpolymer of Example 10 there is added 1% by weight based on the weight of the polymer of benzoyl peroxide. A film is cast from this composition and thereafter irradiated with ultraviolet light overnight (Temperature=40° C.). The resultant properties indicate cross-linking.

EXAMPLE 22

Example 5 is repeated replacing the dicumyl peroxide with the following free radical initiators in the indicated amounts.

G.
(11–A) Benzoyl peroxide _____ 0.4
(11–B) Azabisisobutyronitrile _____ 0.8
(11–C) Phenyl azide _____ 0.6

The resultant properties indicate cross-linking.

EXAMPLE 23

Example 19 is repeated replacing the intiator as follows:

G.
(12–A) Benzoyl peroxide _____ 1.0
(12–B) Phenyl azide _____ 0.9
(12–C) Azobisisobutyronitrile _____ 0.5
(12–D) 2,4-dichlorobenzoyl peroxide _____ 1.2
(12–E) Di-tertiary butyl peroxide _____ 1.5
(12–F) Stearoyl peroxide _____ 0.7

| Carver press time, min. | Cure temp, °C | II flexing cycles | Tensile, p.s.i. | Percent elongation at break | Modulus, percent | | Percent hysteresis |
|---|---|---|---|---|---|---|---|
| | | | | | 100 | 300 | |
| 15 | 160 | 0 | 958 | 1,048 | 221 | 306 | |
| 15 | 160 | 7 | 942 | 920 | 200 | 337 | 16.1 |

EXAMPLE 19

A formulation is made on a 2 roll rubber mill as in Example 5 from polymer 1 of Example 12. 20 grams of polymer (from ε-caprolactone and mixed methyl isomers of ε-caprolactone) and formulated with 9 grams $CaCO_3$ Likewise, 4,4'-diazidodiphenyl sulfone, 4,4'-diphenyldiazonium salt and ultraviolet light, a 60–40 by weight mixture of 4,4'-diphenyldiazide and dicumyl peroxide, a 50–50 by weight mixture of benzoyl-peroxide and dicumyl peroxide, tertiary butyl hydroperoxide and a 70–30

EXAMPLE 24

Example 18 is repeated varying the filler as follows:

|  | G. |
|---|---|
| (14-A) Iron oxide | 5 |
| (14-B) Iron oxide | 8 |
| (14-C) Iron oxide | 15 |
| (14-D) Iron oxide | 20 |
| (14-E) Carbon black | 8 |
| (14-F) Carbon black | 15 |
| (14-G) Carbon black | 25 |
| (14-H) None. |  |
| (14-I) Talc | 10 |
| (14-J) Refined clay | 12 |
| (14-K) Silica |  |

Useful filled rubbers were obtained.

I claim:

1. A process for producing rubbery crosslinked polylactones of improved thermal and decreased solvent solubility properties which comprises heating at a temperature of from 100° C. to 250° C. a polylactone selected from the class consisting of homopolymers of branched lactones, copolymers of branched lactones, copolymers of branched lactones and unbranched lactones, and copolymers of unbranched lactones, the said copolymers having unbranched lactone moieties combining not less than 5 mole percent of any component, said lactones being selected from the branched lactones of the formula:

(A) 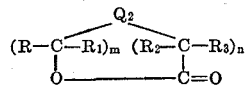

where (1) $Q_2$ is —O—, —S—, or

(2) The R's are independently selected from the group consisting of hydrogen, halogen, alkyl, alkoxy, cycloalkyl, aralkyl, alkaryl, aryl and aryloxy
(3) $m$ and $n$ are integers from 1 to 10
(4) $m+n$ is at least 3
(5) The total number of non-hydrogen R substituents attached to the carbon atoms ranges from 1 to 4
(6) And the unbranched lactones of the formula:

(B) 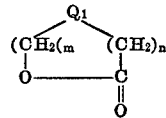

where (a) $Q_1$ is —O—, —S—, or —$CH_2$—
(b) $m+n$ are integers from 1 to 10 and
(c) $m+n$ is at least 3 with from about 0.5 to about 10% by weight based on the weight of the said polylactone of a free radical initiator for a time sufficient to effect a crosslinking reaction.

2. A process as defined in claim 1 wherein the initiator is selected from the group consisting of organic peroxide, organic hydroperoxide, azide, azo, diazonium and diazoamino compounds.

3. A process as defined in claim 2 wherein the heating time ranges from about 1 minute to 1 hour.

4. A process as defined in claim 1 wherein R is alkyl.

5. A process as defined in claim 2 wherein the initiator is an organic peroxide.

6. A process as defined in claim 1 wherein the precursor polylactone is characterized by a viscosity number of from about 1.0 to about 10.0.

7. A process as defined in claim 3 wherein the precursor polylactone is characterized by a reduced viscosity of from about 1.0 to about 10.0.

8. A process as defined in claim 3 wherein the precursor polylactone is characterized by a reduced viscosity of from about 1.5 to about 6.0.

9. A process as defined in claim 1 carried out in the presence of fillers selected from the class consisting of calcium carbonate, neutral and basic carbon black, inorganic metal oxides and silicas.

10. A product obtained by the process of claim 1.

11. A product obtained by the process of claim 9.

12. A rubbery crosslinked copolymer of a branched lactone and an unbranched lactone prepared as in claim 1.

References Cited

UNITED STATES PATENTS

| 3,021,313 | 2/1962 | Cox et al. | 260—78.3 |
| 3,021,317 | 2/1962 | Cox et al. | 260—78.3 |

FOREIGN PATENTS 797,317  10/1968  Canada.

MORRIS LIEBMAN, Primary Examiner

L. T. JACOBS, Assistant Examiner

U.S. Cl. X.R.

260—78.3